(No Model.)
H. V. SMITH.
BIT STOCK.
No. 542,448. Patented July 9, 1895.
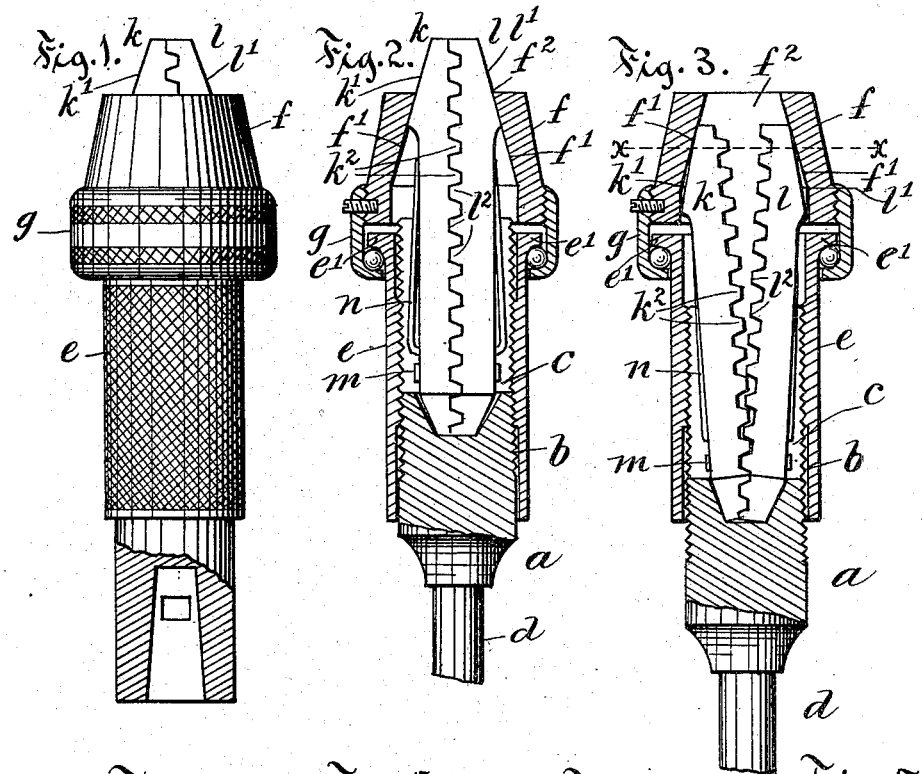
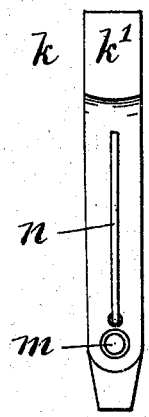 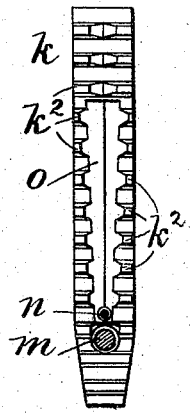 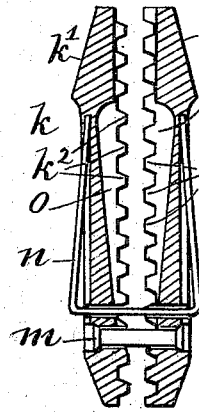 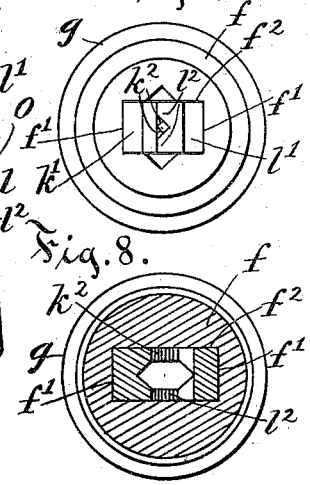
Witnesses:
J. A. Cantin
Arthur B. Jenkins
Inventor:
Henry V. Smith
By Chas. L. Burdett,
Attorney

UNITED STATES PATENT OFFICE.

HENRY V. SMITH, OF HARTFORD, CONNECTICUT.

BIT-STOCK.

SPECIFICATION forming part of Letters Patent No. 542,448, dated July 9, 1895.

Application filed July 14, 1894. Serial No. 517,619. (No model.)

*To all whom it may concern:*

Be it known that I, HENRY V. SMITH, a citizen of the United States, and a resident of Hartford, in the county of Hartford and State of Connecticut, have invented certain new and useful Improvements in Bit-Stocks, of which the following is a full, clear, and exact description, whereby any one skilled in the art can make and use the same.
The object of my invention is to provide for a bit-stock, or other tool or machine embodying a rotary spindle, a form of chuck or tool holder which shall be simple in construction and operation, and be more perfectly adapted for holding tools with shank of different sizes and shapes than prior devices.

To this end my invention consists in the details of the several parts making up the device as a whole, and in the combination of such parts with a shank or spindle, as more particularly hereinafter described, and pointed out in the claims.

Referring to the drawings, Figure 1 is a side view of the chuck with the stem broken away to show construction. Fig. 2 is a view in central section of the chuck and the end of a bit-stock, showing the device with the jaws closed. Fig. 3 is a like view in central section of the chuck, showing the device with the jaws opened. Fig. 4 is a view in elevation of the back of one of the jaws. Fig. 5 is a view in elevation of the holding-face of one of the jaws. Fig. 6 is a view in central section of the jaws arranged parallel to each other. Fig. 7 is a top view of the chuck as shown in Fig. 1 of the drawings. Fig. 8 is a view in crosswise-section on the plane denoted by line $x$ $x$ of Fig. 3, in which the jaws are shown as partly opened.
In the accompanying drawings, the letter $a$ denotes the stem of the tool which in each instance is threaded, as at $b$, and is bifurcated, as by means of a transverse jaw-socket $c$. This stem is preferably secured to the shank $d$ of a bit-stock or brace of any ordinary construction, but it may be so made as to adapt it to be removably secured to the live-spindle of a drill-press, lathe, or like tool by the ordinary means.
The chuck-body is made in two main sections, the sleeve-section $e$ and cam-section $f$, united as by means of a coupling-nut $g$. The sleeve-section $e$ has an interior thread fitting the threaded portion of the stem and movable lengthwise thereon, the outer surface of the sleeve being preferably milled or roughened so as to enable a firm grasp to be maintained on the sleeve for the purpose of turning it. The outer end of the sleeve bears a cone $e'$, which is part of a ball-race located on the outside of the sleeve and formed between the cone, preferably on the outer surface of a flange on the end of the sleeve, and an inturned flange on a coupling-nut $g$, the inner surface of which forms the other part of the ball-race.

The cam-section $f$ of the chuck-body is preferably in shape of a truncated cone with a cylindrical base threaded to receive the threaded portion of the coupling-nut $g$, by means of which the two sections are secured together. The inner surface of the cam-section is provided with cams $f'$, an oblong opening $f^2$ being formed in the end of this section to allow the ends of the jaws to project from the chuck-body.

The clamping-jaws $k$ $l$ are counterparts of each other and are loosely held together by means of a pin $m$ and thrust normally apart by means of a spring $n$, which is U-shaped, is fastened to opposite jaws on the outside and extends through an opening in the jaws and transversely of them, as illustrated in Fig. 6 of the drawings. Each of the jaws has a clamp $k'$ $l'$ on the outer surface of the outer end and the jaws are oblong in cross-section, adapting them to fit in the socket $f^2$ within the section $f$ of the chuck-body, the cams on the back of each jaw near the outer end being adapted to co-operate with the cams on the inner surface of the section $f$, so that when this section and the jaws move lengthwise on one another the jaws are opened or closed according to the direction of movement. The lower ends of the jaws rest in a recess in the floor of the jaw-socket $c$, and the parts are assembled by placing the jaws in the socket in the position indicated in Figs. 2 and 3 of the drawings, then screwing the threaded sleeve down onto the stem, the lengthwise movement of the chuck-body along the stem causing the jaws to be closed from the position shown in Fig.

3 of the drawings into the position shown in Fig. 2. Along the inner surface of each of the jaws a series of teeth $k^2 l^2$ are formed, the two sets intermeshing as illustrated in Figs. 2 and 3 of the drawings, the adjacent faces of the two jaws having also a socket to receive the shank of a tool. This socket is of V shape for the greater part of its length and it extends lengthwise of the jaw. The result of this peculiar construction of the jaws and the holding-faces enables the jaws to firmly close upon a small cylindrical shank of a tool or to grasp a tapered shank of cylindrical form and also to receive and firmly hold the pyramidal end of a boring-bit or like tool.

The main feature of my invention resides in the sectional chuck-body, including the rotary sleeve which enables the cam-section of the chuck to be pulled lengthwise down along the jaws without any rotary movement of the cam-section.

In bit-stocks of this class having a similar stem and tool-holding jaws, the chuck-body is formed in a single piece and is screwed down upon the stem, but during such rotary movement of the chuck-body there is a frictional resistance to the sliding movement of the cam-surfaces against the cams on the back of the outer ends of the jaws, which presents so strong an obstacle to the proper clamping of a tool in the jaws as to cause them to work loose when the tool is put to use.

In my improved construction, as described, the sleeve alone rotates and draws the cam-section lengthwise along the jaws, thus enabling the whole force to be exerted in closing the jaws and causing none to be wasted in overcoming any frictional resistance to rotary movement of the cam-surface of the cam-section of the chuck-body against the cam on the jaw.

A further feature of my invention resides in the peculiar construction of the holding-jaws $k$ and $l$, due in large part to the use of the dentated meeting surfaces. The inner holding-faces of the jaw have for part of their length near the outer end parallel grasping-surfaces formed as stated and of V shape, and as to the rest a socket $o$, deeper near the outer end than the inner and forming a socket substantially square in cross-section, but adapting the jaws to fit against and snugly grasp the squared and tapered pyramidal end of a bit or like tool of common construction. The intermeshing of the teeth the whole length of the jaws enables a better adjustment and grasp of the jaws upon the shank of the tool to be effected, various inclinations from that shown in Fig. 3 of the drawings to the parallel position of the jaws, as shown in Fig. 2, being possible.

The precise form of holding spring $n$ is not essential, but the form and manner of use of the spring shown is preferred; nor is it essential that there should be roller-bearings between the two sections of the chuck-body, although such form of bearing is preferred, as it enables a better result to be obtained.

I claim as my invention—

1. The combination of a stem having a screw-threaded portion, tool-holding jaws connected with the said stem, a chuck body made in sections which are free to rotate relative to each other, one section engaging with the screw-threaded part of the said stem, and the other engaging with the jaws, the coupling nut secured to one of the said sections and having an inturned flange constituting part of a ball race, the other section having a portion formed to constitute the other part of the said ball race, and the antifriction balls located in the said race, substantially as set forth.

2. In combination with a stem having a threaded portion, tool holding jaws carried by the said stem having cams on the outer ends and being of an angular shape in cross-section when closed, a sectional chuck body movable lengthwise of the stem and comprising an outer cam section having a jaw socket fitting the jaws in cross-section, a coupling nut secured to the cam section and having an inturned flange, the sleeve section having an interior thread fitting the threaded portion of the stem, and a cone formed on the outer surface as part of a ball race, and the ball bearings located between the cone and the flange of the nut, all substantially as described.

3. In combination with a stem having a threaded portion and a transverse jaw socket, tool holding jaws, mounted in the said jaw socket whereby they rotate with the stem having cams on the outer ends and being of an oblong shape in cross-section when closed, a sectional chuck body movable lengthwise of the stem and having an outer cam section having an oblong socket to receive the jaws, a coupling nut united to the cam section and having a flange forming part of a ball race, a sleeve section having an interior thread fitting the threaded portion of the stem and a cone forming the complementary part of the ball race, and the ball bearings located within the ball race, all substantially as described.

HENRY V. SMITH.

Witnesses:
CHAS. L. BURDETT,
ARTHUR B. JENKINS.